(12) United States Patent
Tanaka et al.

(10) Patent No.: US 7,387,307 B2
(45) Date of Patent: Jun. 17, 2008

(54) SUSPENSION SYSTEM

(75) Inventors: Masaaki Tanaka, Fuchu-cho (JP); Shinichi Konuma, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 279 days.

(21) Appl. No.: 11/055,081

(22) Filed: Feb. 11, 2005

(65) Prior Publication Data
US 2005/0184481 A1 Aug. 25, 2005

(30) Foreign Application Priority Data
Feb. 19, 2004 (JP) .............................. 2004-043316

(51) Int. Cl.
B60G 15/04 (2006.01)
(52) U.S. Cl. .................. 280/124.135; 280/124.168; 280/124.179
(58) Field of Classification Search ......... 280/124.134, 280/124.135, 124.136, 124.14, 124.141, 280/124.151, 124.168, 124.179, 124.109; 403/114, 226
See application file for complete search history.

(56) References Cited

U.S. PATENT DOCUMENTS

| | | | | |
|---|---|---|---|---|
| 1,595,317 A | * | 8/1926 | Scholey | 251/322 |
| 2,162,828 A | * | 6/1939 | Slack | 280/86.751 |
| 2,455,343 A | * | 11/1948 | Slack et al. | 403/36 |
| 2,466,094 A | * | 4/1949 | Frost, Jr. | 267/204 |
| 2,483,185 A | * | 9/1949 | Crabtree | 267/216 |
| 2,887,310 A | | 5/1959 | Müller | |
| 3,049,359 A | * | 8/1962 | Geyer | 280/6.159 |
| 3,069,149 A | * | 12/1962 | Neff | 267/33 |
| 3,333,653 A | * | 8/1967 | Eirhart, Jr. | 180/359 |
| 3,727,939 A | * | 4/1973 | Mykolenko | 280/124.1 |
| 3,781,033 A | * | 12/1973 | Buchwald | 280/6.157 |
| 3,940,161 A | * | 2/1976 | Allison | 280/124.108 |
| 4,162,064 A | * | 7/1979 | Bouton et al. | 267/177 |
| 4,475,725 A | * | 10/1984 | Niemann | 267/286 |
| 4,690,428 A | * | 9/1987 | Fluegge | 280/124.151 |
| 4,989,894 A | | 2/1991 | Winsor et al. | |
| 5,607,177 A | * | 3/1997 | Kato | 280/124.134 |
| 5,992,867 A | * | 11/1999 | Kato et al. | 280/124.134 |
| 6,196,564 B1 | * | 3/2001 | Hawener et al. | 280/124.162 |
| 6,733,023 B2 | * | 5/2004 | Remmert et al. | 280/124.179 |

(Continued)

FOREIGN PATENT DOCUMENTS

DE 30 12 873 A1 10/1981

(Continued)

OTHER PUBLICATIONS

Boulogne-Billancourt, Fr., "*Focus: Ford Met Au Point Une Nouvelle Approche Du Produit*" Revue Technique Automobile, ETAI., vol. 53, No. 612, pp. 28-32 (Dec. 1998).

(Continued)

*Primary Examiner*—Eric Culbreth
*Assistant Examiner*—Karen Jane J. Amores
(74) *Attorney, Agent, or Firm*—Studebaker & Brackett PC; Donald R. Studebaker

(57) ABSTRACT

A suspension system includes a lower arm having an I-shaped cross section. A coil spring seat portion is formed on the lower arm for supporting a coil spring. A center of stiffness of the lower arm is so located with respect to a centerline of load applied to the lower arm that the lower arm bends upward when a compressive force is applied thereto.

1 Claim, 6 Drawing Sheets

U.S. PATENT DOCUMENTS

2005/0184481 A1* 8/2005 Tanaka et al. ........ 280/124.134

FOREIGN PATENT DOCUMENTS

| EP | 0 182 607 A2 | 5/1986 |
|---|---|---|
| EP | 0 963 866 A2 | 12/1999 |
| FR | 01-030-793 | 6/1953 |
| JP | 11-217015 | 8/1999 |
| JP | 2002-293120 | 10/2002 |
| JP | 2002-316228 | 10/2002 |

OTHER PUBLICATIONS

European Search Report Dated Mar. 9, 2005 for Application No. EP 05 00 2367.

* cited by examiner

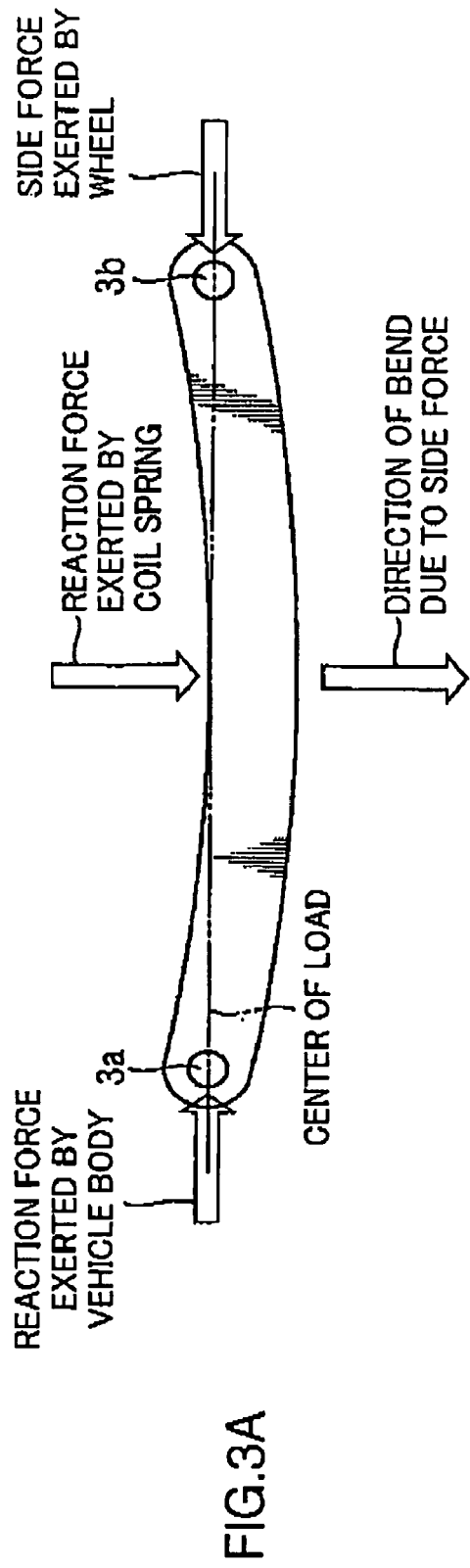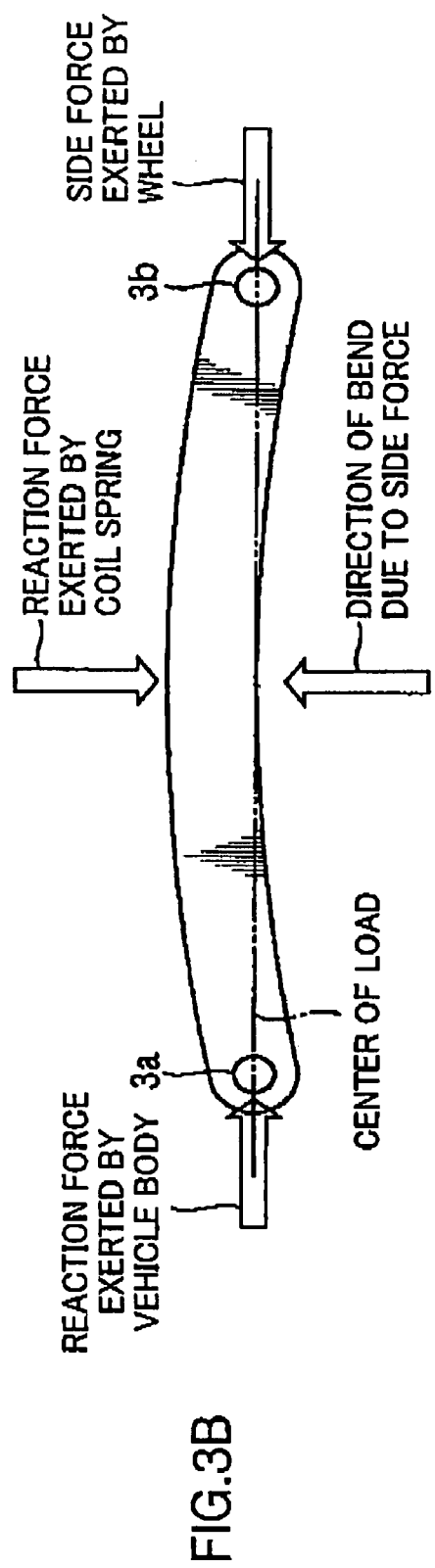
FIG.3A PRIOR ART
FIG.3B

PRIOR ART

SUSPENSION SYSTEM

BACKGROUND OF THE INVENTION

1. Field of the Invention

The present invention relates to a suspension system of a motor vehicle.

2. Description of the Related Art

Today, motor vehicles, such as minivans and wagons, generally employ in their rear suspension systems a structure in which coil springs are disposed separately from shock absorbers, or dampers, and mounted directly on lower suspension arms having an I-shaped cross section as shown in Japanese Unexamined Patent Publication No. 2002-293120 to provide as large an in-vehicle space as possible, rather than a structure in which each coil spring surrounds a damper in a coaxial configuration. In this kind of motor vehicles, great emphasis is placed on their performance to give a comfortable ride. To ensure increased riding comfort, it has been necessary to make the length of the coil springs as large as possible.

In the aforementioned structure in which the coil springs are mounted directly on the lower arms, the height of a floor of the vehicle increases if the length of the coil springs is increased and, therefore, it has been essential to give particular consideration to vehicle design to provide a large in-vehicle space. To achieve this design objective, the aforementioned Japanese Unexamined Patent Publication No. 2002-293120 proposes an independent suspension type rear suspension system employing a specially designed structure including coil springs placed between a vehicle body and left and right lower arms having an I-shaped cross section in which an upward opening dish-shaped (or recessed) coil spring seat portion is formed in each of the lower arms at about the middle of the length thereof for supporting the coil springs. Provided with the recessed coil spring seat portion in each of the lower arms, this lower arm structure is intended to locate lower ends of the coil springs as low as possible so that the length of the coil springs can be increased. This approach is now widely taken for granted in the aforementioned kind of motor vehicles.

Even if the length of the coil springs is increased by forming the recessed coil spring seat portions in the lower arms for supporting the coil springs as mentioned above, however, it is actually impossible to achieve a desired level of ride quality. Taking this into consideration, the inventors of the present invention have come to a finding which is explained below. If side forces act on the lower arms under conditions where the motor vehicle is in a cornering maneuver, there arises a compressive force exerted on each of the lower arms. The inventors have found that this compressive force produces a large amount of stress applied to the lower arms, causing the lower arms to bend downward, due to the presence of the recessed coil spring seat portions accommodating the lower ends of the coil springs of which length have been increased for improving the riding comfort.

More specifically, the center of stiffness of each lower arm is significantly lowered due to the presence of the recessed coil spring seat portion and is greatly offset downward from a centerline of load applied by the compressive force caused by the side force acting on each lower arm and, therefore, a great downward bending force is exerted on each lower arm.

In addition to this downward bending force, a reaction force exerted downward by the coil spring due to rolling motion of the vehicle acts on one of the lower arms during cornering, so that the lower arm is subjected to a considerably large downward bending force when the side forces are present. Conventionally, the lower arms have been made so large-sized that the lower arms would not deform due to the bending force exerted thereupon. In addition, the conventional lower arms would become so heavy to provide desired stiffness that the coil springs must have a high modulus of elasticity to suppress vibrations and oscillation of the heavy lower arms. For this reason, it has not been possible to achieve the desired level of ride quality with the conventional lower arm structure even though the length of the coil springs is increased to realize enhanced riding comfort.

SUMMARY OF THE INVENTION

In view of the foregoing, it is an object of the invention to provide a motor vehicle suspension system which can provide a high level of ride quality, the suspension system including coil springs mounted on lower arms which are structured based on an all-new design concept.

A suspension system of the invention includes a lower arm having an I-shaped cross section disposed between a vehicle body and a wheel support member, and a coil spring which is placed between the vehicle body and a coil spring seat portion of the lower arm in a manner that the coil spring can be compressed along a vertical direction, wherein an inner end (one end) of the lower arm is attached to the vehicle body in such a way that the lower arm can swing up and down with respect to the vehicle body, while an outer end (the other) of the lower arm is attached to the wheel support member in such a way that the lower arm can swing up and down with respect to the wheel support member. In this suspension system of the invention, a center of stiffness of the lower arm is located above with respect to a line, or a centerline of load applied to the lower arm, interconnecting a pivot axis of the lower arm at the inner end thereof and a pivot axis of the lower arm at the outer end thereof in such a way that the lower arm bends upward when a compressive force is applied thereto from the vehicle body and the wheel support member.

In the context of this invention, the "center of stiffness" of any mechanical component refers to a point where that component exhibits maximum stiffness and the location of the center of stiffness of the component is determined by various factors, such as material, overall shape and cross-sectional shape of the component and how that component has been formed.

In the suspension system of the invention thus structured, a bending force exerted on the lower arm due to the compressive force applied thereto and a bending force exerted on the lower arm due to a reaction force from the coil spring cancel each other out since these bending forces act in opposite directions. Therefore, the lower arm is not required to have so high a degree of stiffness and this makes it possible to reduce the weight of the lower arm. Also, the aforementioned structure of the suspension system makes it possible to reduce the modulus of elasticity of the coil spring and achieve an increased level of ride quality.

These and other objects, features and advantages of the invention will become more apparent upon reading the following detailed description along with the accompanying drawings.

BRIEF DESCRIPTION OF THE DRAWINGS

FIGS. 3A and 3B are schematic diagrams showing loads exerted on a lower arm according to a conventional design concept and on a lower arm according to a technological concept of the embodiment, respectively;

DETAILED DESCRIPTION OF THE PREFERRED EMBODIMENTS OF THE INVENTION

A preferred embodiment of the present invention is now described, by way of example, with reference to the accompanying drawings, in which the invention is applied to a suspension system A for a right-hand wheel portion of a motor vehicle.

Figure 1:
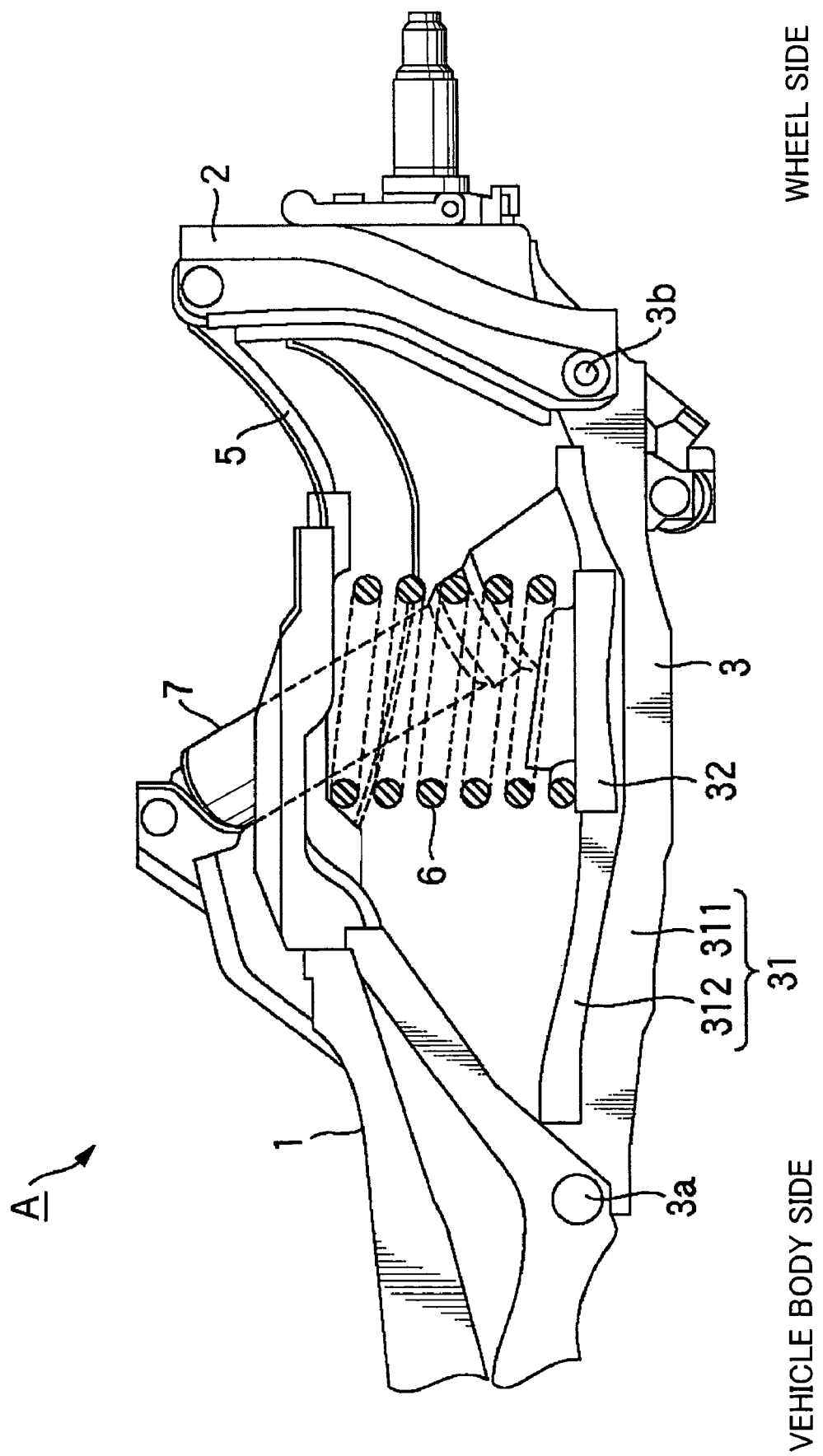
FIG. 1 is a rear view showing a principal part of a suspension system of a motor vehicle according to a preferred embodiment of the invention.
Figure 2:
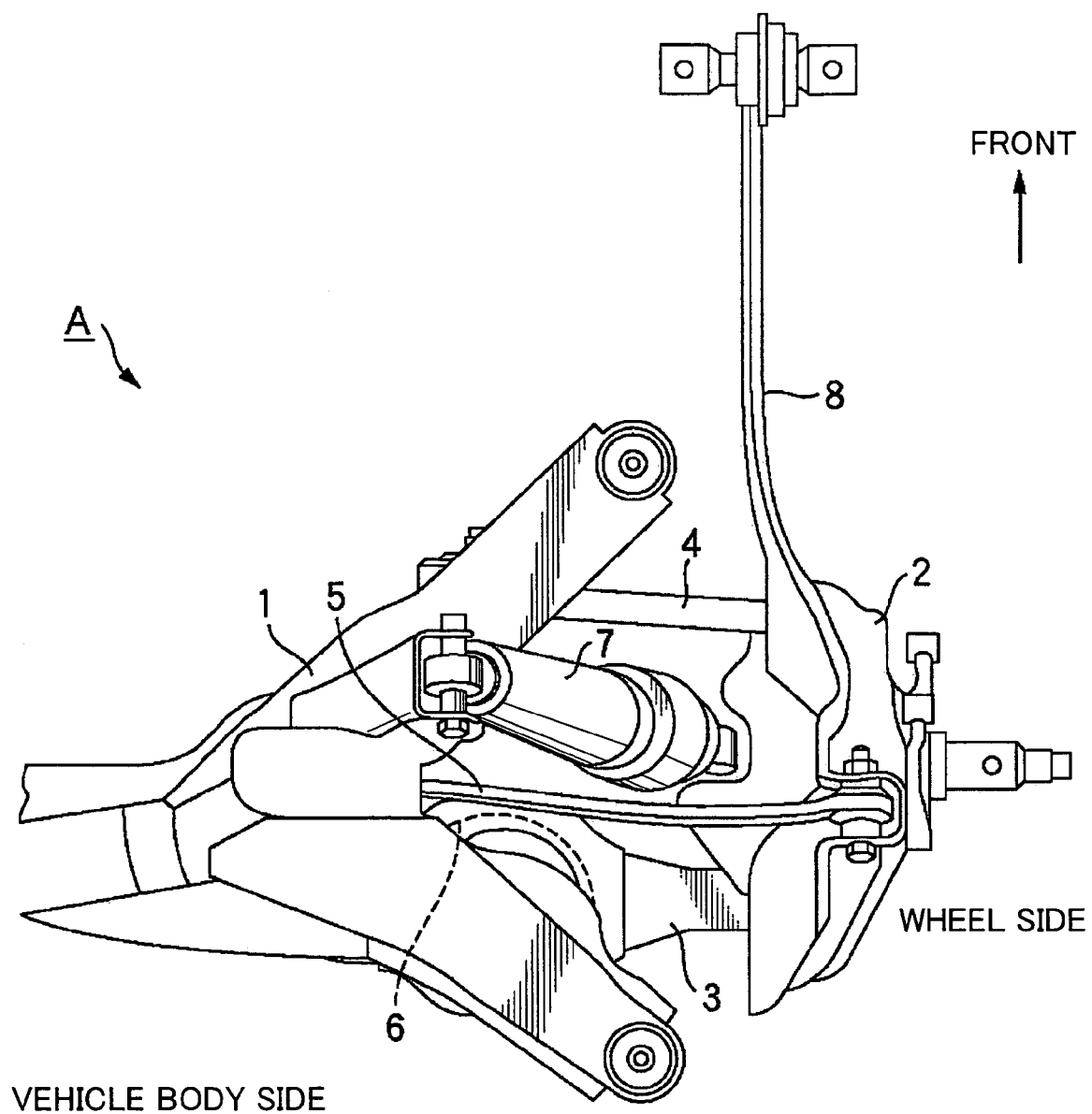
FIG. 2 is a top view of the principal part of the suspension system.

FIG. 1 is a rear view showing a principal part of the suspension system A according to the preferred embodiment of the invention, and FIG. 2 is a top view of the principal part of the suspension system A.

The suspension system A is a wishbone-type rear suspension system which includes lower arms 3, 4 and an upper arm 5 interconnecting a vehicle body member 1 and a wheel support member 2 rotatably supporting a wheel (not shown), a coil spring 6 which is placed between the vehicle body member 1 and the lower arm 3 in a manner that the coil spring 6 can be compressed along a vertical direction, a damper 7 mounted between the vehicle body member 1 and the wheel support member 2, the damper 7 inclining from a lower part of the wheel support member 2 inward toward a centerline of the vehicle, and a swing arm 8 supported between a frame (not shown) under a floor of the vehicle body and the wheel support member 2.

The lower arm 3 is attached swingably up and down to the vehicle body member 1 and the wheel support member 2. More specifically, one end of the lower arm 3 is attached to the vehicle body member 1 by means of a shaft 3a in such a way that the lower arm 3 can pivot up and down, while the other end of the lower arm 3 is attached to the wheel support member 2 by means of a shaft 3b in such a way that the lower arm 3 can pivot up and down with respect to the wheel support member 2. The lower arm 4 located on the front side of the lower arm 3 is attached swingably up and down to both the vehicle body member 1 and the wheel support member 2 by a similar structure as used for the lower arm 3. The upper arm 5 and the damper 7 are also attached swingably up and down to the vehicle body member 1 and the wheel support member 2. Further, the swing arm 8 is attached swingably up and down to the frame (not shown) under the floor of the vehicle body.

In the suspension system A thus structured, the lower arms 3, 4, the upper arm 5 and the swing arm 8 together support the wheel support member 2 while confining movements of the wheel support member 2 to limited directions. As the wheel support member 2 moves due to up and down movements of the wheel, for example, the coil spring 6 helps maintain the wheel in contact with the ground by elastic deformation while the damper 7 serves to dampen impact to the vehicle body and attenuates vibrations of the coil spring 6.

Now, the lower arm 3 is discussed in further detail. In this embodiment, the lower arm 3 is made of a bar having an I-shaped cross section for receiving a reaction force exerted by the coil spring 6. The lower arm 3 of this embodiment is structured based on the following technological concept. FIGS. 3A and 3B are schematic diagrams showing loads exerted on a lower arm 3 according to a conventional design concept and on the lower arm 3 according to the technological concept of the present embodiment, respectively.

As shown in FIG. 3A, a side force exerted on the wheel acts on the lower arm 3 via the wheel support member 2 during a cornering maneuver of the motor vehicle, for instance. As a result, the vehicle body member 1 exerts a reaction force on the lower arm 3 so that the lower arm 3 receives a compressive force acting along a longitudinal direction. As the side force and the reaction force act on the lower arm 3 via the shaft 3b and the shaft 3a, respectively, a center of load exerted on the lower arm 3 is represented by an imaginary line interconnecting axes of the shaft 3a and the shaft 3b which serve as pivot axes as illustrated. Also, when the coil spring 6 is compressed as a result of a rolling motion of the vehicle during the cornering maneuver, the lower arm 3 receives a compressive force exerted by the coil spring 6 which acts to restore an original length from a compressed state. Thus, a middle portion of the lower arm 3 receives a downward-oriented reaction force exerted by the coil spring 6.

In the aforementioned conventional lower arm structure, part of the lower arm is recessed to form a dish-shaped coil spring seat portion. For this reason, the direction of bend of the lower arm 3 due to the compressive force produced by the side force exerted from the wheel and the reaction force exerted from the vehicle body member 1 is downward as is the direction of the reaction force exerted by the coil spring 6 as shown in FIG. 3A. Therefore, the lower arm 3 receives superimposed loads which cause the lower arm 3 to bend downward, making it essential for the lower arm 3 to have high stiffness. This results in an increase in the weight of the lower arm 3 and a need to increase the modulus of elasticity of the lower arm 3. As a consequence, it is impossible to realize a comfortable ride even if the length of the coil spring 6 is increased.

If the direction of bend of the lower arm 3 due to the compressive force produced by the side force exerted from the wheel and the reaction force exerted from the vehicle body member 1 can be made upward, opposite to the direction of the reaction force exerted by the coil spring 6 as shown in FIG. 3B, an upward bending force exerted on the lower arm 3 due to the compressive force applied thereto and a downward bending force exerted on the lower arm 3 due to the reaction force from the coil spring 6 mostly cancel each other out. Therefore, a lower arm structure shown in FIG. 3B does not require so high a degree of stiffness of the lower arm 3 as the lower arm structure of FIG. 3A. Consequently, the lower arm structure of the embodiment shown in FIG. 3B makes it possible to reduce the weight of the lower arm 3 as well as the modulus of elasticity of the coil spring 6, yet ensuring an increased level of ride quality.

To cause the lower arm 3 to bend upward due to the compressive force exerted thereupon, the center of stiffness of the lower arm 3 and, in particular, the center of stiffness of a portion of the lower arm 3 receiving the reaction force from the coil spring 6, should be located above the aforementioned center of load exerted on the lower arm 3. If the lower arm 3 can be structured with the center of stiffness thus located, the bending force exerted on the lower arm 3 due to the compressive force applied thereto and the bending force exerted on the lower arm 3 due to the reaction force from the coil spring 6 cancel each other out. As a result, the weight of the lower arm 3 can be reduced while providing sufficient durability against the side force and the modulus of elasticity of the coil spring 6 can be reduced, yet ensuring a high level of ride quality.

Structured based on the aforementioned design concept, the center of stiffness of the lower arm 3 is located higher in the present embodiment. One approach to locating the center of stiffness of the lower arm 3 at a higher position is to increase the stiffness of an upper side of the lower arm 3. While various other approaches to this objective might be available, the present embodiment adopts a structure in which the location of the center of stiffness of the lower arm 3 is made higher by increasing the stiffness of the upper side of the lower arm 3 mainly with many constituent parts disposed on top of the lower arm 3. Note that the center of stiffness of a lower arm can be obtained by the following steps of calculations:

First of all, a lateral position of the lower arm 3 along a lateral direction at which the most deformation takes place due to the buckling loads (a reaction force exerted from a vehicle body to one end and a side force exerted by a wheel to the other end as shown in FIG. 3A) is obtained by a calculation;

Second around the most deformable position of the lower arm 3 along a lateral direction, a cross section at the lateral position is taken;

Third, on the cross section, a moment of inertia "I" (basically a function of sectional modulus "Z") and Young's module "E" (or modulus of elasticity) is obtained with respect to each of the moderately divided small segments of the cross section and these values "I" and "E" are multiplied each other to obtain "I"×"E" with respect to each of the small segments; Note that the adequate size of small segment for the cross section is to be determined depending upon the nature of the cross section, i.e., shape, configuration and different materials used.

Fourth, the summation of those values "I"×"E" above the imaginary line (the center of load) connecting the shafts 3a, 3b, and the summation of those values "I"×"E" below said line are obtained; and then Fifth, compare which summed values is larger, if the summed value for the above area is larger than those for the lower area, then it means that the center of stiffness is located in the area above the line connecting the shafts 3a, 3b. If the relation is opposite, i.e., the summation value for the lower half is greater than that of the upper half, then the center of stiffness is considered to be on the lower side of said line connecting the shafts 3a, 3b.

Further note that the reason for obtaining "I"×"E" is that this multiplied value is basically an indication of the degree of resistance of the portion of member against any external force applied thereto. Of course, if the same material is used throughout the lower arm 3, then E can be treated as a constant value, thus there are no needs for multiplication of "I" with "E".

Needless to say it is assumed no sharp notch or a significant change in dimension of the lower arm 3 where a stress concentration likely occurs do not exist in the lower arm 3.

Figure 4A:
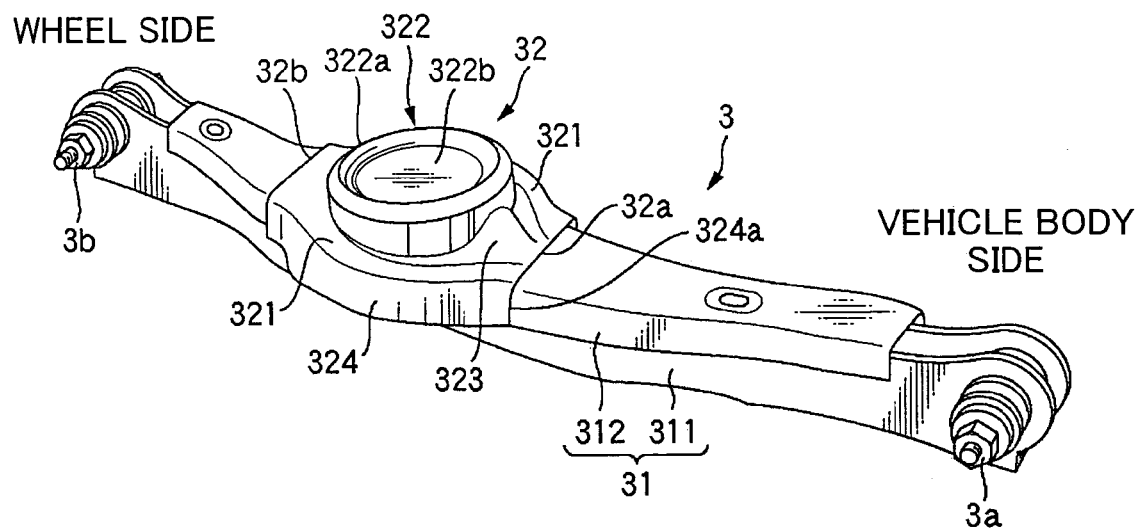
FIGS. 4A, 4B and 4C are a perspective view showing the external appearance of the lower arm of the embodiment, a side view of the lower arm and a bottom view of the lower arm, respectively.
Figure 4B:
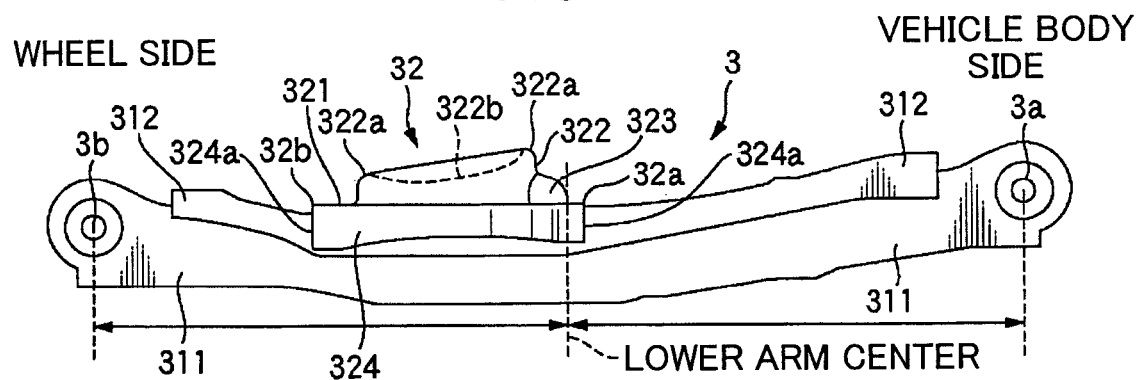
Figure 4C:
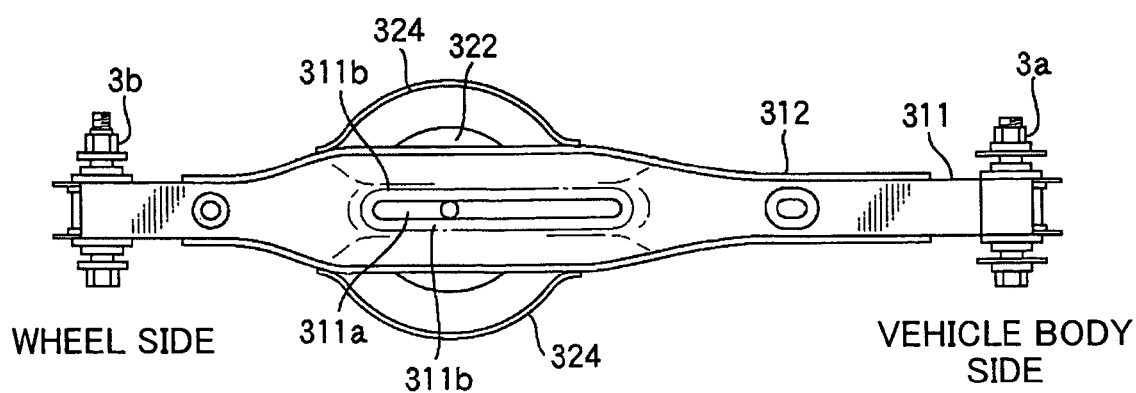

FIG. 4A is a perspective view showing the external appearance of the lower arm 3, FIG. 4B is a side view of the lower arm 3 and FIG. 4C is a bottom view of the lower arm 3.

The lower arm 3 includes an arm unit 31 fitted with the shaft 3a at one end and the shaft 3b at the other end, and a seat member 32 constituting a coil spring seat portion for supporting the coil spring 6. The seat member 32 is formed as a separate element and assembled with the arm unit 31. The seat member 32 is attached to a top surface of the arm unit 31 so that the seat member 32 is located, almost in its entirety, above the top surface of the arm unit 31. Having a supporting surface 321 which forms a seat on which a lower end of the coil spring 6 rests, the seat member 32 is structured such that the supporting surface 321 is level with or located above the top surface of the arm unit 31. As the seat member 32 is attached to the top surface of the arm unit 31 and located, almost in its entirety, above the top surface of the arm unit 31, an upper part of the lower arm 3, where the coil spring seat portion receiving the reaction force from the coil spring 6 is located, is given a high degree of stiffness and the center of stiffness of the lower arm 3 becomes higher than that of the aforementioned conventional dish-shaped coil spring seat structure.

The seat member 32 has a hollow protruding part 322 extending upward from the supporting surface 321 into an internal space of the coil spring 6 as depicted in FIG. 1, the supporting surface 321 surrounding the protruding part 322 generally in an annular shape. The provision of this protruding part 322 serves to increase the stiffness of the upper part of the lower arm 3 at the coil spring seat portion and make the center of stiffness of the lower arm 3 higher.

On an upper end surface of the protruding part 322 of the seat member 32, there is formed a circular protruding rim 322a slightly rising upward from a central portion 322b of the upper end surface of the protruding part 322. With the provision of this protruding rim 322a, the protruding part 322 becomes structurally more rigid. As a result, the stiffness of the upper part of the lower arm 3 is more increased at the coil spring seat portion and the center of stiffness of the lower arm 3 is made even higher. The central portion 322b of the upper end surface of the protruding part 322 is not flat but has a concave shape, curved like an inner surface of a sphere sloping downward from the outer periphery (protruding rim 322a) toward the center. This structure serves to increase the stiffness of the protruding part 322. Consequently, the stiffness of the upper part of the lower arm 3 is further increased at the coil spring seat portion and the center of stiffness of the lower arm 3 is made still higher.

On the other hand, the arm unit 31 includes a main arm member 311 which is curved slightly downward and a bracket member 312 disposed on top of the main arm member 311 for adjusting the vertical position of the seat member 32 which is attached to a top surface of the bracket member 312. In this embodiment, the main arm member 311 has a generally U-shaped cross section opening upward while the bracket member 312 has a generally U-shaped cross section opening downward. The main arm member 311 and the bracket member 312 both having the generally U-shaped cross section serve to reduce the weight of the lower arm 3. Also, since the main arm member 311 is curved downward, it is possible to increase the total length of the coil spring 6. Additionally, since the vertical position of the seat member 32 can be adjusted due to the provision of the bracket member 312, it is possible to minimize a lowering of the center of stiffness of the lower arm 3.

A central portion 311a of a bottom surface of the arm unit 31 (that is, a bottom surface of the main arm member 311) located below the seat member 32 protrudes upward from a surrounding portion 311b (refer to FIG. 4C). As the central portion 311a of the arm unit 31 bulges upward in this way, the center of stiffness of the lower arm 3 is made yet higher.

The seat member 32 is attached to the bracket member 312 at an edge 32a on an inner side facing the vehicle body member 1 and at an edge 32b on an outer side facing the wheel support member 2. Since the seat member 32 is attached to the bracket member 312 at two points (32a, 32b) separated from each other along the longitudinal direction of the lower arm 3, the seat member 32 can effectively resist the bending force exerted on the lower arm 3. The location of the seat member 32 on the lower arm 3 is offset toward the side of the wheel support member 2 along the longitudinal direction of the lower arm 3 (refer to FIG. 4B). Also, the protruding part 322 of the seat member 32 is formed such that the protruding part 322 has a larger height on the inner side near the middle of the lower arm 3 than at the outer side facing the wheel support member 2 (refer to FIG. 4B).

In this structure of the embodiment, the seat member 32 is offset from the middle of the lower arm 3 along the longitudinal direction thereof as mentioned above, so that it is desirable to enhance the stiffness of the middle portion of the lower arm 3 where the greatest bending force is applied. Since the protruding part 322 of the seat member 32 is made higher on the inner side near the middle of the lower arm 3 in this structure, it is possible to locate the center of stiffness of the lower arm 3 at a higher position at the middle portion of the lower arm 3.

The seat member 32 further has a stopper portion 323 protruding upward from the supporting surface 321 of the seat member 32 for prohibiting the coil spring 6 from rotating about its own central (longitudinal) axis. The stopper portion 323 is a hollow structure bulging sideways from a cylindrical side surface of the protruding part 322 of the seat member 32. The stopper portion 323 is formed along the longitudinal direction of the lower arm 3 on the supporting surface 321 at a portion thereof closer to the vehicle body member 1. Since the seat member 32 is offset from the middle of the lower arm 3 along the longitudinal direction thereof as mentioned above, it is desirable to enhance the stiffness of the middle portion of the lower arm 3 where the greatest bending force is applied. In the aforementioned structure of the embodiment, the stopper portion 323 is formed along the longitudinal direction of the lower arm 3 on the supporting surface 321 at the portion thereof closer to the vehicle body member 1 (that is, close to the middle of the lower arm 3), so that the stopper portion 323 can serve as an element resisting the bending force applied to the middle portion of the lower arm 3.

The seat member 32 further has a pair of facing flange portions 324 extending downward from the supporting surface 321, the flange portions 324 forming side surfaces of the seat member 32. As an alternative, the seat member 32 may be structured in such a way that the flange portions 324 extend upward from the supporting surface 321. Since the seat member 32 has the protruding part 322, however, this alternative structure would give the seat member 32 an extraordinarily high stiffness, causing the seat member 32 to exhibit a bending characteristic significantly differing from that of the arm unit 31 and leading to eventual separation of the arm unit 31 and the seat member 32, for instance. Under these circumstances, the seat member 32 is structured such that the flange portions 324 extend downward from the supporting surface 321 to give the seat member 32 an appropriate level of stiffness in the present embodiment.

The flange portions 324 do not form a perfectly annular shape but has cutouts 324a located one each on the inner side facing the vehicle body member 1 and on the outer side facing the wheel support member 2 to allow the arm unit 31 to pass through. The provision of these cutouts 324a serves to facilitate the mounting of the seat member 32 on the arm unit 31 and prevents the seat member 32 from exhibiting a bending characteristic significantly differing from that of the arm unit 31, because the seat member 32 having the cutouts 324a has lower stiffness than a seat member 32 of which flange portion 324 forms an unbroken annular shape.

Figure 5A:
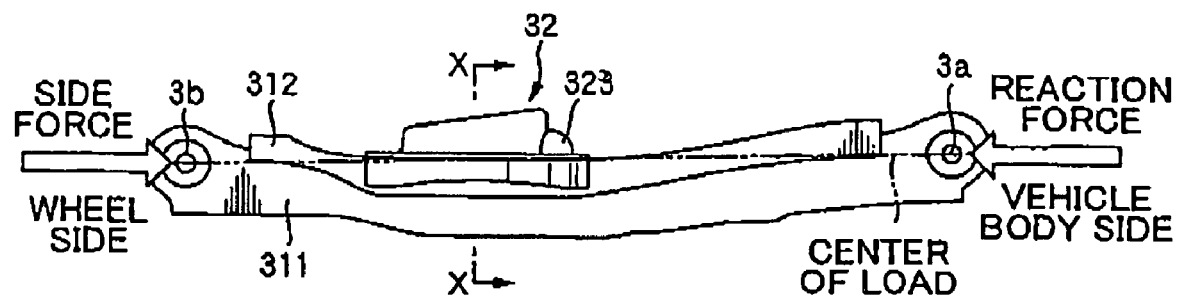
FIGS. 5A, 5B and 5C are a side view showing a center of load exerted on the lower arm of the invention, a cross-sectional view taken along lines X-X of FIG. 5A, and a cross-sectional view of a coil spring seat portion of the conventional lower arm showing a relationship between the location of a center of load and the location of a center of stiffness.
Figure 5B:
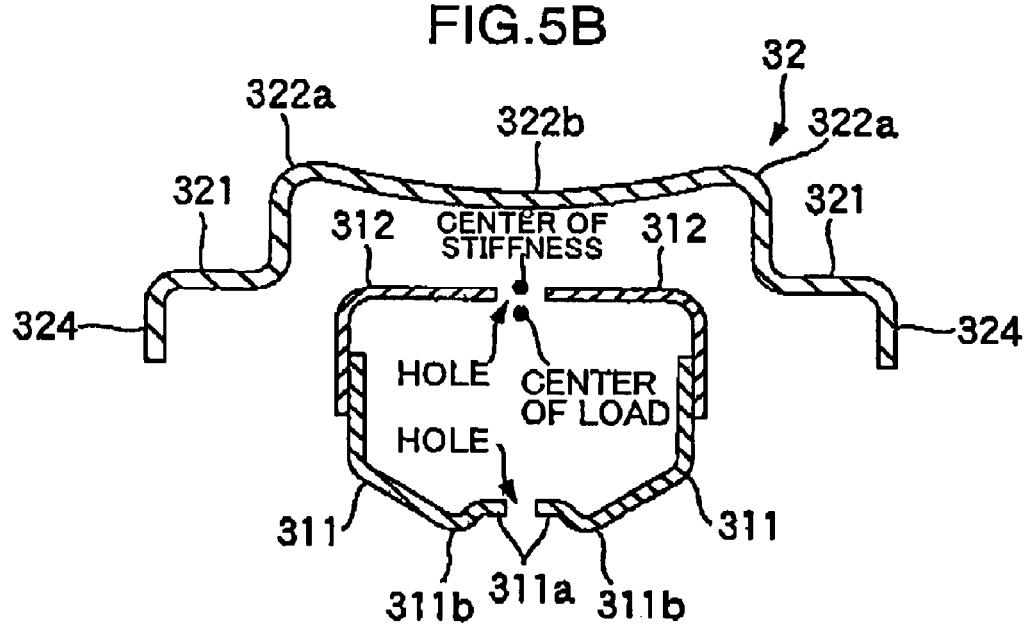
Figure 5C:
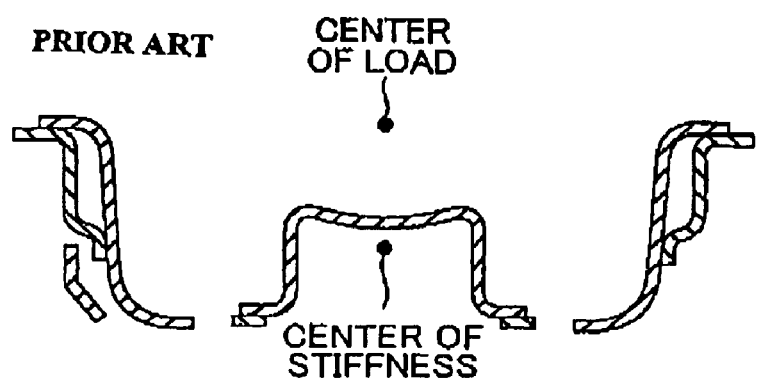

Now, a relationship between the location of the center of load exerted on the lower arm 3 and the location of the center of stiffness thereof is discussed. FIG. 5A is a side view showing the center of load exerted on the lower arm 3 of the embodiment, FIG. 5B is a cross-sectional view taken along lines X-X of FIG. 5A, and FIG. 5C is a cross-sectional view of a coil spring seat portion according to the aforementioned conventional lower arm structure showing the relationship between the location of the center of load and the location of the center of stiffness.

As illustrated in FIG. 5A, the center of load exerted on the lower arm 3 is represented by an imaginary line interconnecting the axes of the shaft 3a and the shaft 3b which serve as the pivot axes. In the lower arm 3 of this embodiment as illustrated in FIG. 5B, the center of stiffness of the lower arm 3 is located above the center of load exerted on the lower arm 3. Since the center of stiffness is located above the center of load in the lower arm 3 of the embodiment, the lower arm 3 bends upward when a compressive force acts on the lower arm 3 along the longitudinal direction thereof. As previously discussed, the bending force exerted on the lower arm 3 due to the compressive force applied thereto and the bending force exerted on the lower arm 3 due to the reaction force from the coil spring 6 cancel each other out. As a result, the weight of the lower arm 3 can be reduced while providing sufficient durability against the side force and the modulus of elasticity of the coil spring 6 can be reduced, yet ensuring a high level of ride quality. In the conventional lower arm illustrated in FIG. 5C, on the other hand, the center of stiffness of the lower arm is markedly offset downward from the center of load exerted on the lower arm and, thus, the lower arm bends downward when a compressive force acts thereon as previously mentioned. Therefore, the conventional lower arm structure does not produce the same working and effects as the aforementioned structure of the present embodiment.

If the location (height) of the center of stiffness is so determined that the upward bending force exerted on the lower arm 3 due to the compressive force produced by the side force exerted from the wheel and the reaction force exerted from the vehicle body member 1 is approximately equal to the downward bending force exerted on the lower arm 3 due to the reaction force from the coil spring 6 when the side force exerted on the lower arm 3 is maximized, the upward bending force and the downward bending force exerted on the lower arm 3 cancel each other out almost completely. If the lower arm 3 is so structured, it is possible to further reduce the weight of the lower arm 3 as well as the modulus of elasticity of the coil spring 6. While the location of the center of stiffness of the lower arm 3 in an area where the central (longitudinal) axis of the coil spring 6 passes has been discussed with reference to FIG. 5B, it is more preferable that the center of stiffness of the lower arm 3 be positioned at the same height as or above the center of load exerted on the lower arm 3 not only in the area where the central axis of the coil spring 6 passes but in every area of the lower arm 3 located beneath the coil spring 6.

Figure 6:
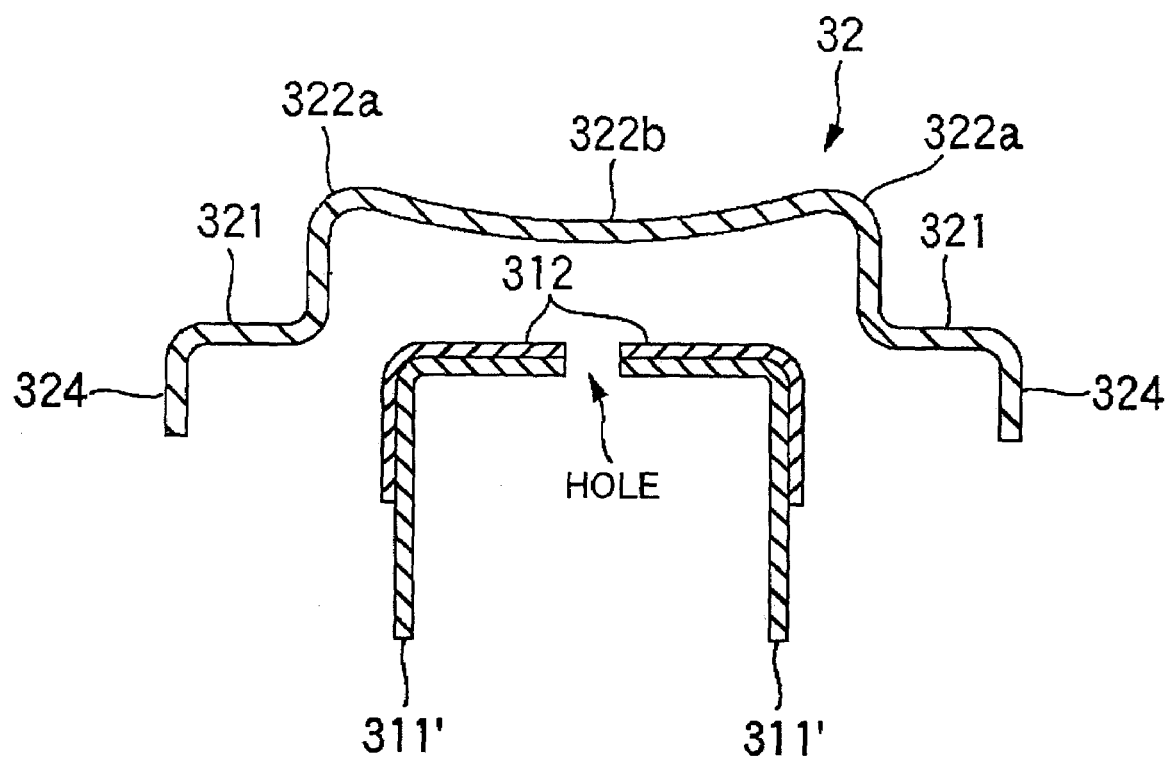
FIG. 6 is a cross-sectional view of a lower arm in one variation of the embodiment.

While the foregoing discussion of the preferred embodiment has illustrated the lower arm 3 including the main arm member 311 having a generally U-shaped cross section opening upward, the embodiment may be modified such that the lower arm 3 employs a main arm member 311' having a generally U-shaped cross section opening downward as shown in FIG. 6. This variation of the embodiment serves to locate the center of stiffness of the lower arm 3 at a higher position than in the lower arm 3 employing the upward-opening main arm member 311.

In summary, a suspension system of the invention includes a lower arm having an I-shaped cross section disposed between a vehicle body and a wheel support member, and a coil spring which is placed between the vehicle body and a coil spring seat portion of the lower arm in a manner that the coil spring can be compressed along a vertical direction, wherein an inner end (one end) of the lower arm is attached to the vehicle body in such a way that the lower arm can swing up and down with respect to the vehicle body, while an outer end (the other) of the lower arm is attached to the wheel support member in such a way that the lower arm can swing up and down with respect to the wheel support member. In this suspension system of the invention, a center of stiffness of the lower arm is located above with respect to a line, or a centerline of load applied to the lower arm, interconnecting a pivot axis of the lower arm at the inner end thereof and a pivot axis of the lower arm at the outer end thereof in such a way that the lower arm bends upward when a compressive force is applied thereto from the vehicle body and the wheel support member.

In the context of this invention, the "center of stiffness" of any mechanical component refers to a point where that component exhibits maximum stiffness and the location of the center of stiffness of the component is determined by, various factors, such as material, overall shape and cross-sectional shape of the component and how that component has been formed.

In the suspension system of the invention thus structured, a bending force exerted on the lower arm due to the compressive force applied thereto and a bending force exerted on the lower arm due to a reaction force from the coil spring cancel each other out since these bending forces act in opposite directions. Therefore, the lower arm is not required to have so high a degree of stiffness and this makes it possible to reduce the weight of the lower arm. Also, the aforementioned structure of the suspension system makes it possible to reduce the modulus of elasticity of the coil spring and achieve an increased level of ride quality.

In one aspect of the invention, the location of the center of stiffness of the lower arm is preferably so determined that an upward bending force exerted on the lower arm due to a side force exerted on a wheel becomes approximately equal to a downward bending force exerted on the lower arm due to a reaction force from the coil spring when the side force is maximized.

In the suspension system thus structured, the upward bending force caused by the side force exerted on the wheel and the downward bending force caused by the reaction force from the coil spring cancel each other out almost completely when the side force is maximized. This structure makes it possible to further reduce the weight of the lower arm as well as the modulus of elasticity of the coil spring.

What is necessary to ensure that the lower arm bends upward when a compressive force is applied thereto from the vehicle body and the wheel support member is to locate the center of stiffness of the lower arm at a point higher than the centerline of load applied to the lower arm.

In another aspect of the invention, the aforementioned coil spring seat portion preferably includes a supporting surface for supporting the coil spring and a protruding part extending upward from the supporting surface into an internal space of the coil spring, the supporting surface surrounding the protruding part generally in an annular shape.

The provision of this protruding part serves to increase the stiffness of an upper part of the lower arm at the coil spring seat portion and make the center of stiffness of the lower arm higher.

In another aspect of the invention, there is preferably formed a circular protruding rim on an upper end surface of the protruding part of the coil spring seat portion.

As the circular protruding rim is formed on the upper end surface of the protruding part in this structure, the protruding part becomes structurally more rigid. As a result, the stiffness of the upper part of the lower arm is more increased at the coil spring seat portion and the center of stiffness of the lower arm is made even higher.

In another aspect of the invention, the upper end surface of the protruding part of the coil spring seat portion preferably has a concave shape, curved like an inner surface of a sphere sloping downward from an outer periphery toward a central portion of the upper end surface of the protruding part.

In this structure, the upper end surface of the protruding part of the coil spring seat portion is formed into a concave shape, so that the stiffness of the protruding part is increased. Consequently, the stiffness of the upper part of the lower arm is further increased at the coil spring seat portion and the center of stiffness of the lower arm is made still higher.

In another aspect of the invention, the protruding part of the coil spring seat portion is preferably made higher on an inner side along a longitudinal direction of the lower arm near a mid-length point thereof.

In this structure, the protruding part of the coil spring seat portion is made higher on the inner side near the middle of the lower arm where the greatest bending force is applied and, therefore, it is possible to locate the center of stiffness of the lower arm at a higher position at a middle portion of the lower arm.

In one preferred form of the invention, the lower arm includes an arm unit of which both ends constitute the aforementioned inner end and outer end of the lower arm, and a seat member including a supporting surface for supporting the coil spring and the coil spring seat portion, the seat member being an element formed separately from the arm unit, wherein the arm unit includes a main arm member which is curved downward and a bracket member disposed on top of the main arm member for adjusting the vertical position of the seat member, and wherein the seat member is attached to a top surface of the bracket member.

Since the main arm member is curved downward in this structure, it is possible to increase the total length of the coil spring. Also, since the seat member is attached to the top surface of the bracket member, it is possible to locate the center of stiffness of the lower arm at a higher position. Additionally, since the vertical position of the seat member can be adjusted due to the provision of the bracket member, it is possible to minimize a lowering of the center of stiffness of the lower arm even when the main arm member is bent downward.

In another preferred form of the invention, the main arm member has a generally U-shaped cross section opening downward.

Since the main arm member has a generally U-shaped cross section opening downward in this structure, it is possible to locate the center of stiffness of the lower arm at a higher position.

In another aspect of the invention, the seat member is preferably attached to the bracket member at an end facing the vehicle body and at another end facing the wheel support member.

In this structure, the seat member is attached to the bracket member at two points separated from each other along the longitudinal direction of the lower arm, so that the seat member can effectively resist the bending force exerted on the lower arm.

In another preferred form of the invention, the lower arm includes an arm unit of which both ends constitute the inner end and the outer end of the lower arm, and a seat member including a supporting surface for supporting the coil spring and the coil spring seat portion, the seat member being an element formed separately from the arm unit, wherein the seat member is located at a position offset toward the wheel support member along a longitudinal direction of the lower arm, the seat member having a stopper portion protruding upward from the supporting surface of the seat member for prohibiting the coil spring from rotating about a longitudinal axis thereof, and wherein the stopper portion is formed along the longitudinal direction of the lower arm on the supporting surface at a portion thereof closer to the vehicle body.

In this structure, the stopper portion is formed along the longitudinal direction of the lower arm on the supporting surface at the portion thereof closer to the vehicle body, so that the stopper portion can serve as an element resisting the bending force applied to the middle portion of the lower arm.

In another aspect of the invention, a central portion of a bottom surface of the lower arm located below the coil spring seat portion preferably protrudes upward from a surrounding portion.

Since the central portion of the bottom surface of the lower arm located below the coil spring seat portion bulges upward in this structure, the center of stiffness of the lower arm is made yet higher.

In still another preferred form of the invention, the lower arm includes an arm unit of which both ends constitute the inner end and the outer end of the lower arm, and a seat member including the supporting surface for supporting the coil spring and the coil spring seat portion, the seat member being an element formed separately from the arm unit, wherein the seat member has a flange extending downward from the supporting surface of the seat member, the flange forming a side surface of the seat member.

In this structure, the flange extends downward from the supporting surface of the seat member. As an alternative, the seat member may be structured in such a way that the flange extends upward from the supporting surface of the seat member. Since the seat member has the aforementioned protruding part, however, this alternative structure would give the seat member an extraordinarily high stiffness, causing the seat member to exhibit a bending characteristic significantly differing from that of the arm unit and leading to eventual separation of the arm unit and the seat member, for instance. Under these circumstances, the seat member is structured such that the flange extends downward from the supporting surface of the seat member in this invention to give the seat member an appropriate level of stiffness.

In another aspect of the invention, the flange may have a cutout to allow the arm unit to pass through.

The provision of the cutout formed in the flange serves to facilitate the mounting of the seat member on the arm unit and prevents the seat member from exhibiting a bending characteristic significantly differing from that of the arm unit, because the seat member having the cutout has lower stiffness than a seat member of which flange forms an unbroken annular shape.

Another suspension system of the invention includes a lower arm having an I-shaped cross section disposed between a vehicle body and a wheel support member, and a coil spring which is placed between the vehicle body and a coil spring seat portion of the lower arm in a manner that the coil spring can be compressed along a vertical direction, wherein an inner end of the lower arm is attached to the vehicle body in such a way that the lower arm can swing up and down with respect to the vehicle body, while an outer end of the lower arm is attached to the wheel support member in such a way that the lower arm can swing up and down with respect to the wheel support member. In this suspension system of the invention, the lower arm includes an arm unit of which both ends constitute the aforementioned inner end and outer end of the lower arm, and a seat member including a supporting surface for supporting the coil spring and the coil spring seat portion, the seat member being an element formed separately from the arm unit, wherein the seat member has a protruding part extending upward from the supporting surface into an internal space of the coil spring, and wherein the seat member is attached to a top surface of the arm unit so that the seat member is located almost in an entirety thereof above the top surface of the arm unit.

In the suspension system of the invention thus structured, the seat member is located almost in its entirety above the top surface of the arm unit and has the protruding part extending upward from the supporting surface. Therefore, an upper part of the lower arm, where the coil spring seat portion receiving a reaction force from the coil spring is located, is given a high degree of stiffness and the center of stiffness of the lower arm becomes considerably higher than that of the earlier-mentioned conventional dish-shaped coil spring seat structure.

This application is based on Japanese patent application serial No. 2004-43316, filed in Japan Patent Office on Feb. 19, 2004, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:
1. A suspension system comprising:
   a lower arm having a cross section disposed between a vehicle body and a wheel support member, and
   a coil spring which is placed between the vehicle body and a coil spring seat portion of the lower arm in a manner that the coil spring is compressed along a vertical direction;
   wherein one end of the lower arm is attached to the vehicle body in such a way that the lower arm can swing up and down with respect to the vehicle body, while the other end of the lower arm is attached to the wheel support member in such a way that the lower arm can swing up and down with respect to the wheel support member;

wherein a center of stiffness of the lower arm is located above with respect to a line interconnecting a pivot axis of the lower arm at the one end thereof and a pivot axis of the lower arm at the other end thereof in such a way that an upwardly acting force is generated at a middle of the lower arm when a compressive force is applied thereto from the vehicle body and the wheel support member;

wherein the lower arm includes an arm unit of which both ends constitute said one end and said other end of the lower arm, and a seat member including a supporting surface for supporting the coil spring and said coil spring seat portion, the seat member being an element formed separately from the arm unit;

wherein the seat member is located at a position offset toward the wheel support member along a longitudinal direction of the lower arm, the seat member having a stopper portion protruding upward from the supporting surface of the seat member for prohibiting the coil spring from rotating about a longitudinal axis thereof; and wherein the stopper portion is formed along the longitudinal direction of the lower arm on the supporting surface at a portion thereof closer to the vehicle body.

* * * * *